United States Patent [19]
Legro et al.

[11] Patent Number: 5,930,099
[45] Date of Patent: Jul. 27, 1999

[54] GROUNDING ARRANGEMENT FOR A POWERLINE SYSTEM

[75] Inventors: Andrew James Legro, Pittsburgh; Martin Baier, Cranberry; David D. Shipp, Murrysville, all of Pa.

[73] Assignee: Siemens Westinghouse Power Corporation, Iselin, N.J.

[21] Appl. No.: 09/108,034

[22] Filed: Jun. 30, 1998

[51] Int. Cl.⁶ ................................................. H02H 7/20
[52] U.S. Cl. ........................................... 361/112; 361/111
[58] Field of Search .................................. 361/2, 6, 8, 10, 361/11, 13, 18, 42, 47, 49, 50, 56, 110, 111, 112, 120, 137, 138; 340/853.1, 855.8, 855.9; 702/62

[56] References Cited

U.S. PATENT DOCUMENTS

| | | |
|---|---|---|
| 3,611,044 | 10/1971 | Osterhout et al. .................. 317/70 |
| 4,157,535 | 6/1979 | Balkanli .............................. 340/853.3 |
| 4,602,240 | 7/1986 | Perkins et al. ..................... 340/310.07 |
| 4,628,398 | 12/1986 | Cook ....................................... 361/120 |
| 4,912,589 | 3/1990 | Stolarczyk ............................ 361/56 |
| 5,515,038 | 5/1996 | Smith .................................. 340/853.3 |
| 5,555,150 | 9/1996 | Newman, Jr. .......................... 361/56 |

*Primary Examiner*—Ronald W. Leja

[57] ABSTRACT

A grounding arrangement for a normally ungrounded multiphase powerline system, which also carries dc information signals. A resistance and a spark gap device are provided in a path between system neutral and a ground. Upon the occurrence of a predetermined fault condition the spark gap device will conduct, and if the voltage developed across the resistance is of a predetermined value, a current bypass path is established around the spark gap device after a predetermined time delay.

11 Claims, 6 Drawing Sheets

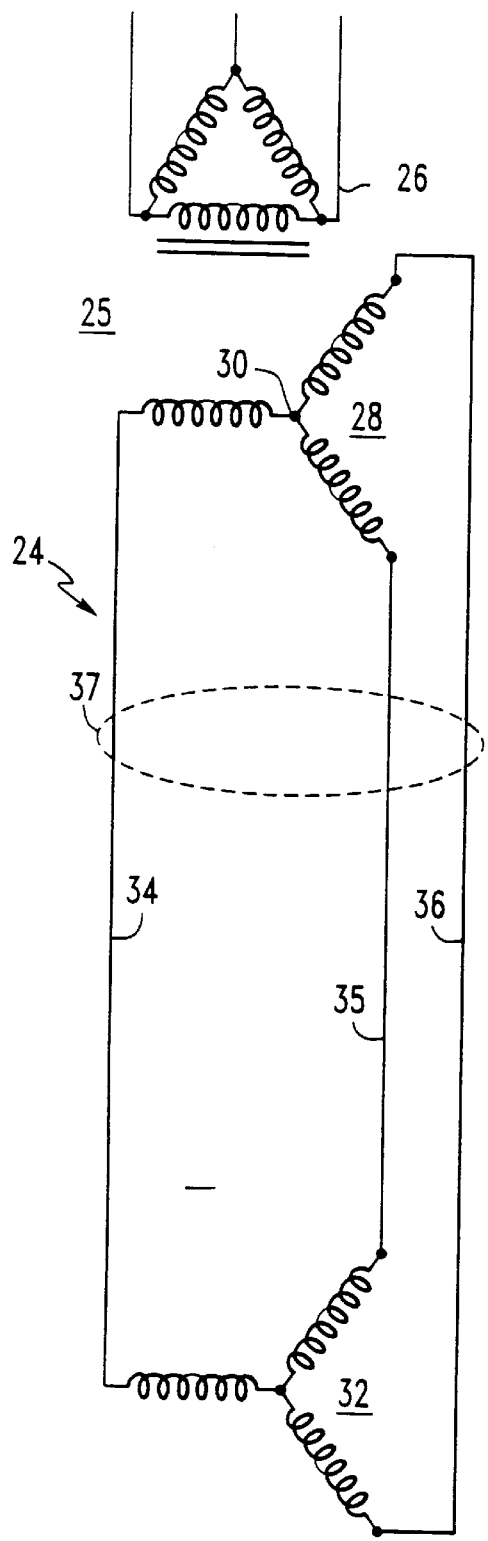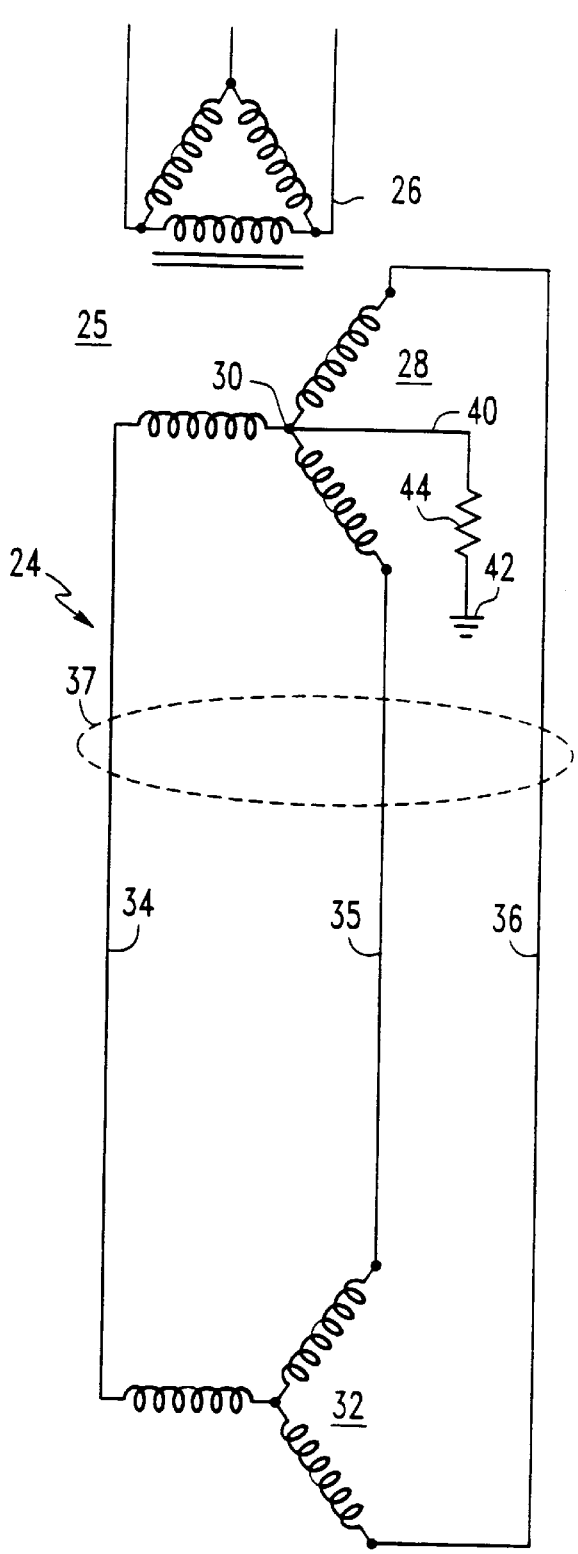
FIG. 2A
PRIOR ART
FIG. 2B
PRIOR ART

GROUNDING ARRANGEMENT FOR A POWERLINE SYSTEM

BACKGROUND OF THE INVENTION

1. Field of the Invention

The invention in general relates to a powerline system and more particularly to a system which also carries information via the powerline.

2. Description of Related Art

In a powerline system electrical energy produced at a first location is delivered via the powerlines to a load at a remote second location. In one type of powerline system the load may be an electrical device such as a motor which drives a mechanical device such as a pump. For example, in the field of mining or oil production an electro-submersible pump is often utilized for pumping fluid such as water or oil.

In many such systems it is desirable to be able to know certain operating conditions at the electro-submersible pump location. Accordingly one or more sensors are positioned to obtain indications of these operating conditions, for example, temperature, pressure, etc., and this information is transmitted back to a receiver system along the powerline conductors, usually as dc signals.

In order to accomplish this signal transmission, the powerline neutral must be ungrounded since a grounded neutral point would short out the information signals. If a powerline ground fault does occur it would be desirable to have a grounded system to protect the powerline conductors and other components.

These seemingly contrary objectives are met by the present invention.

SUMMARY OF THE INVENTION

A grounding arrangement is provided for an ungrounded powerline system which also carries information signals. Upon the occurrence of a predetermined ground fault situation, the grounding arrangement, connected to a system neutral point, will operate to provide a path to ground for the system neutral. A resistive means is connected to the neutral. Connected between an electrical ground and the resistive means is an overvoltage spark gap device having a predetermined threshold voltage, which, if exceeded, will cause it to conduct. A circuit means is included and is responsive to a predetermined voltage across the resistive means, caused by the predetermined fault situation, to establish a current bypass around the spark gap device. To obviate this action in response to a temporary ground fault, the current bypass path around the spark gap device may be established after a predetermined time delay.

BRIEF DESCRIPTION OF THE DRAWINGS

FIGS. 2A and 2B illustrate, respectively, an ungrounded and resistance grounded multi-phase powerline system.

DESCRIPTION OF THE PREFERRED EMBODIMENT

Figure 1:
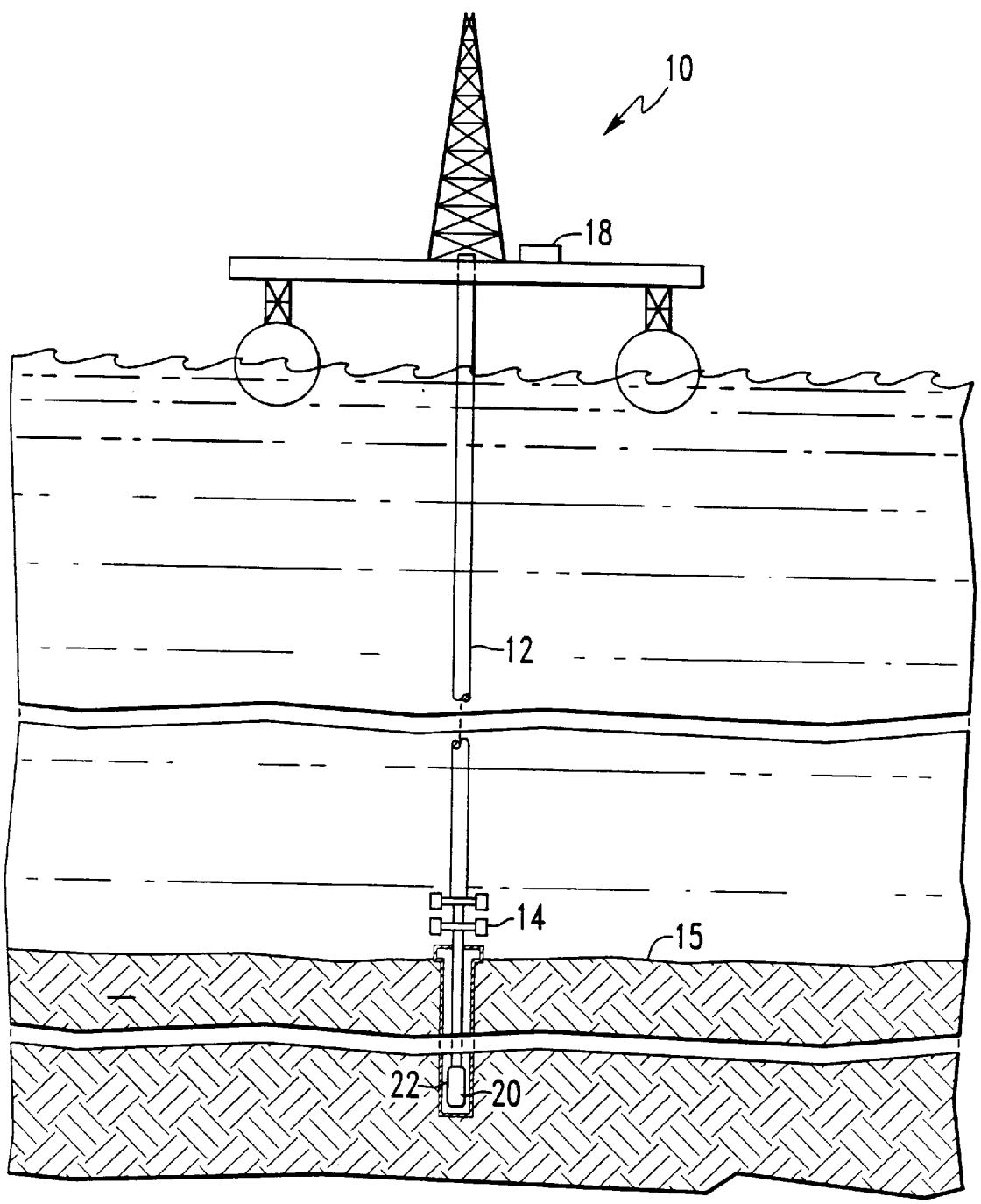
FIG. 1 illustrates one environment in which the present invention may be used.

In the drawings, which are not necessarily to scale, like or corresponding parts are denoted by like or corresponding reference numerals.

As previously indicated, the invention may be used in a variety of different environments, one of which is illustrated in FIG. 1. An offshore oil platform 10 has a casing 12 extending from the platform 10 at a first location, to an underwater wellhead 14 at the bottom 15 of a body of water.

A powerline system, having electrical conductors within the casing 12, includes a power supply 18 at the platform 10 for delivering electric energy to a submersible pump 20, at a second, remote location within an oil producing well 22. The powerline system may be a multiphase system such as the 3-phase ungrounded system illustrated in FIG. 2A or a grounded system such as illustrated in FIG. 2B.

In FIG. 2A, a powerline system 24 includes a three-phase transformer 25 having by way of example, a delta connected primary winding 26 of a power supply (not illustrated) coupled to a wye connected secondary winding 28 having a system neutral 30. Power is supplied to the winding 32 of the motor which drives the submersible pump 20 (FIG. 1) via electrical conductors 34, 35 and 36 within a protective cable 37.

This type of ungrounded arrangement can extend the operational lifetime of the pump system and can usually withstand a solid single line to ground fault because relatively little ground current will flow. A problem arises however, in that arcing ground faults may cause large transient overvoltages or resonant conditions between the shunt capacitive reactance to ground and the series inductive reactance of the system, causing voltage escalation insulation damage and burning of the faulted cable.

To correct for this disadvantage of an ungrounded system, the system may be grounded as in FIG. 2B wherein a conductor 40 connects the system neutral 30 to ground 42. For high voltage operation a resistor (or impedance) 44 is inserted in the path to ground to limit the fault current. The grounded system however, cannot be used if information is to be transmitted along the powerline conductors, such as illustrated in FIG. 3.

Figure 3:
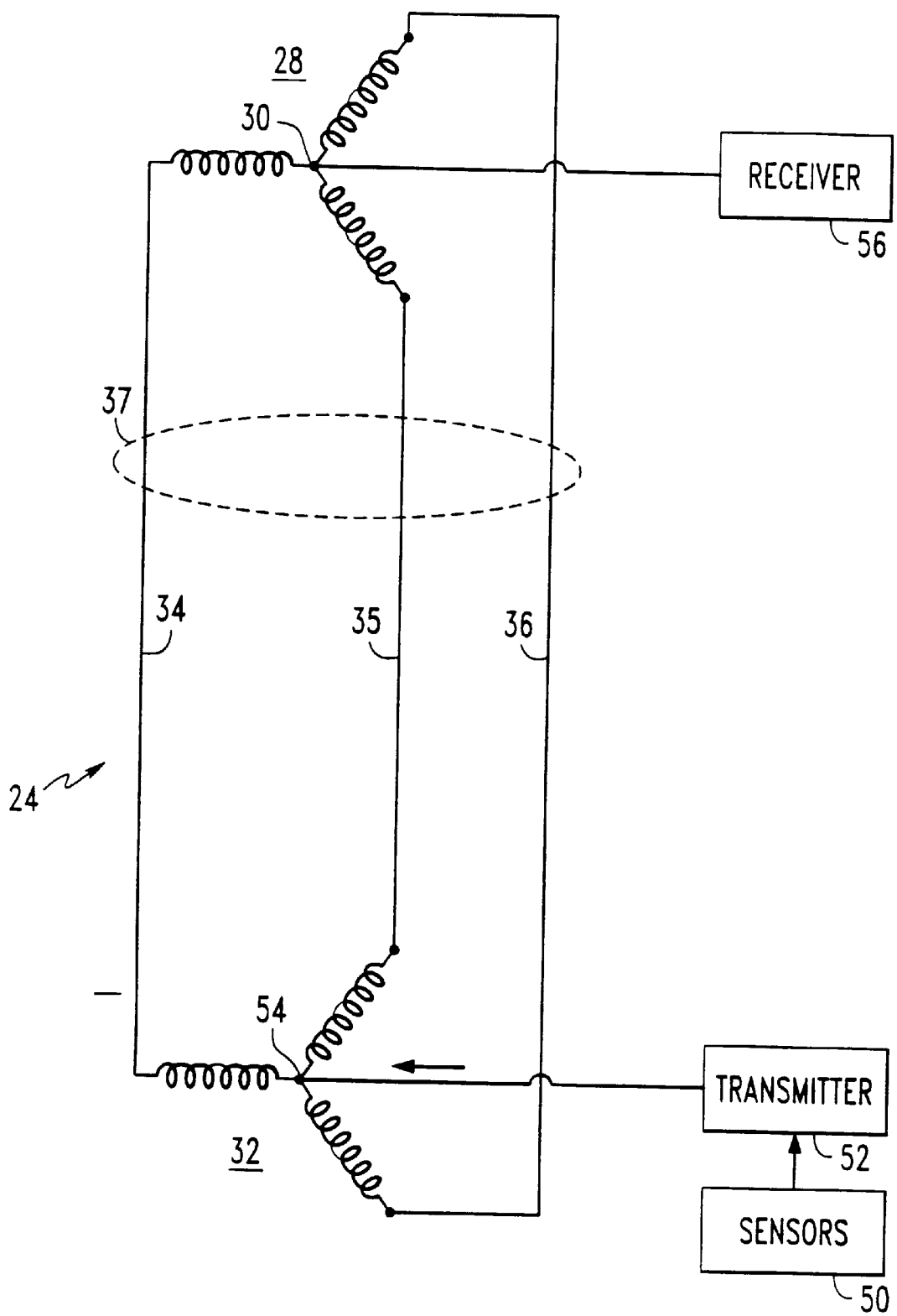
FIG. 3 illustrates the powerline of FIG. 2A along with a sensor system for transmitting information along the powerline conductors.

In one form of powerline carrier system, as illustrated in FIG. 3, an array of sensors 50 provides output signals indicative of certain parameters such as down hole pressure, temperature, motor speed etc. and this information is provided to transmitter 52 connected to neutral 54 of winding 32 for transmission along the wireline conductors, as dc signals. This transmission of information is detected at receiver 56, connected to secondary winding 28, where it may be utilized for control, or other purposes. Any grounding of the system would short out the dc information transmission and accordingly, an ungrounded system is used.

Figure 4:
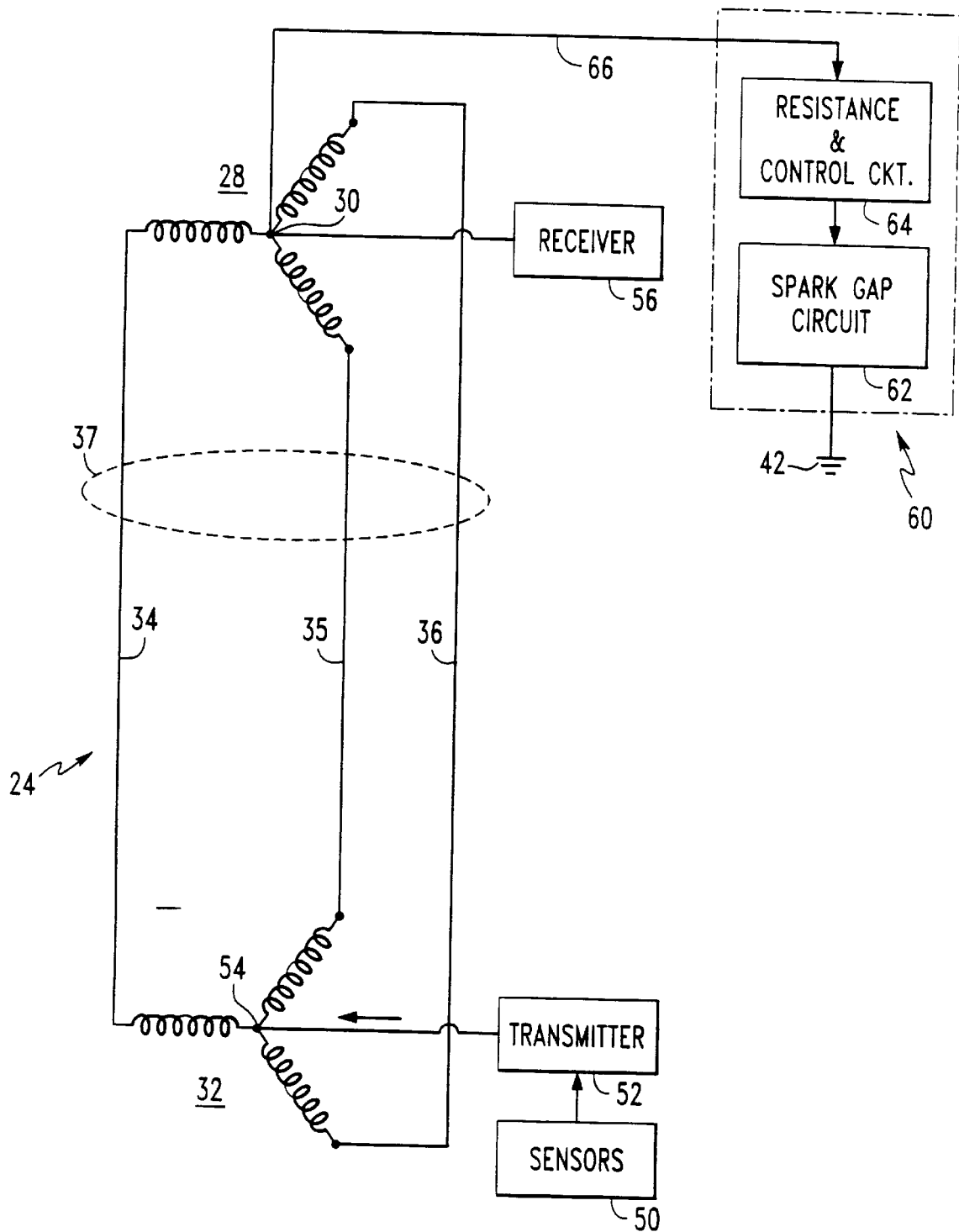
FIG. 4 is a block diagram illustrating the concept of the present invention.

FIG. 4 illustrates an embodiment of the invention wherein the system operates as an ungrounded system to allow for wireline communication but upon occurrence of a fault, a grounding arrangement will be activated. The grounding arrangement 60 includes a spark gap circuit 62, connected to ground 42, as well as a resistance and control circuit 64 connected to neutral 30 of winding 28 by means of lead 66.

Figure 5:
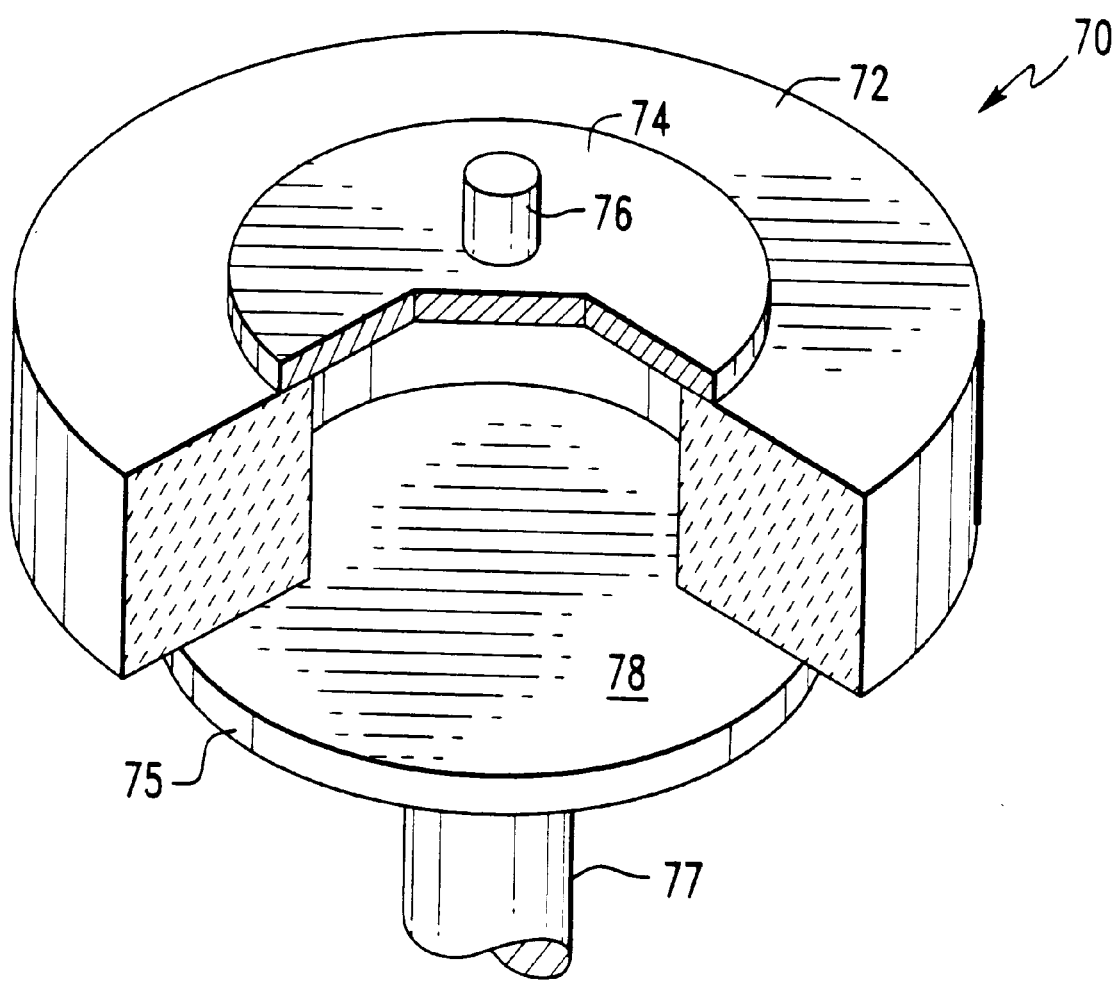
FIG. 5 is a view, with a portion broken away, of a component used in FIG. 4.

The spark gap circuit 62, to be described, utilizes an overvoltage spark gap device 70 as illustrated in FIG. 5. Such devices are commonly used in a surge protection system to protect electronic circuitry, or the like. The spark gap device 70 of FIG. 5 includes a toroidal member 72, such as of ceramic or porcelain, capped by electrodes 74 and 75 having respective connectors 76 and 77. The arrangement defines an interior volume 78 which is filled with a gas at a predetermined pressure. When the voltage between electrodes 74 and 75 exceeds a predetermined design value, the spark gap will break down and the device will fire, allowing electrical conduction between its electrodes.

Figure 6A:
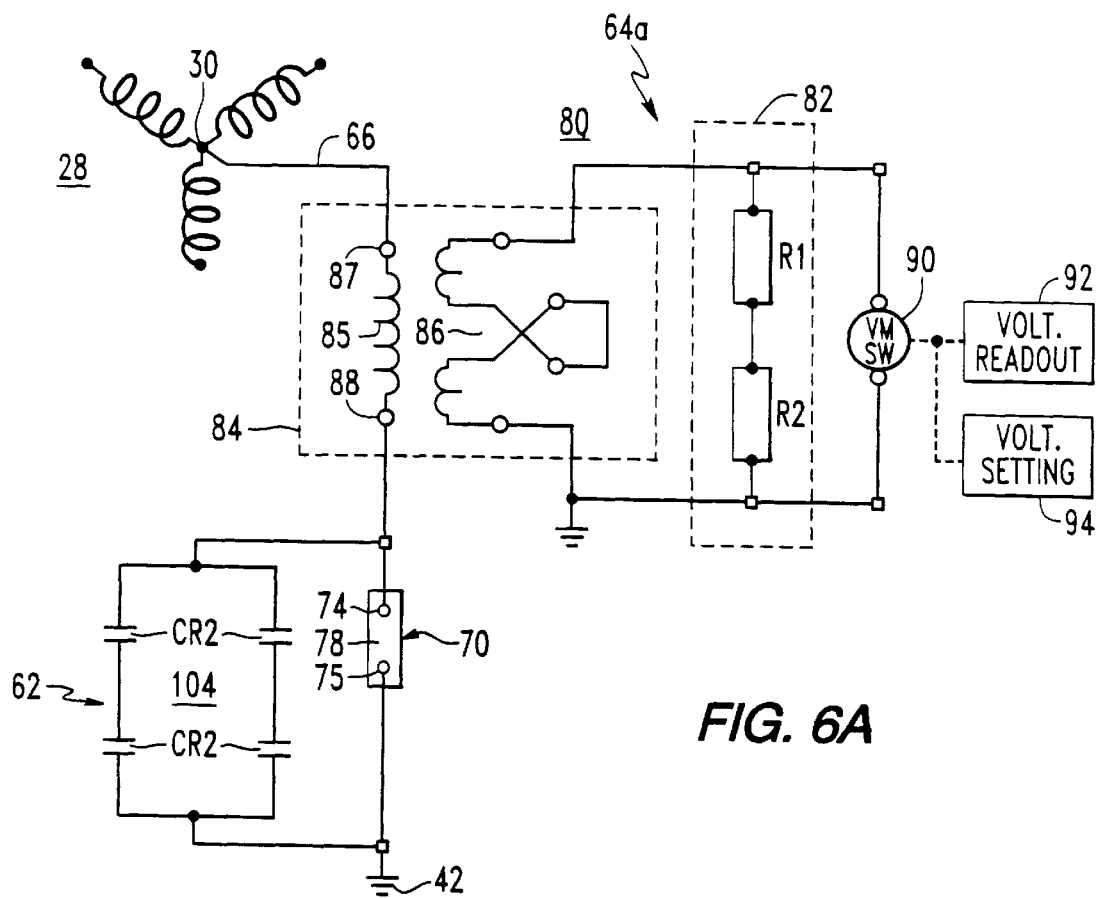
FIGS. 6A and 6B are circuit diagrams of the arrangement of FIG. 4 in more detail.

FIG. 6 shows a portion, 64a, of circuit 64, along with a more detailed showing of spark gap circuit 62. A resistive means 80 includes resistance 82 made up of series connected high current resistors R1 and R2. A single phase transformer 84 has a primary winding connected between neutral 30 and spark gap device 70, and secondary windings 86 connected across resistor 82. More particularly, a first end, 87, of winding 85 is connected via lead 66 to neutral 30, and a second end, 88, is connected to electrode 74 of spark gap device 70.

A voltmeter/relay 90 is operable to sense the secondary voltage of transformer 84 and display it on voltage readout 92, and when this voltage exceeds the breakdown voltage of spark gap device 70 a grounding operation will commence. An amount by which this voltage exceeds the breakdown voltage of spark gap device 70 may be established by voltage setting mechanism 94.

Figure 6B:
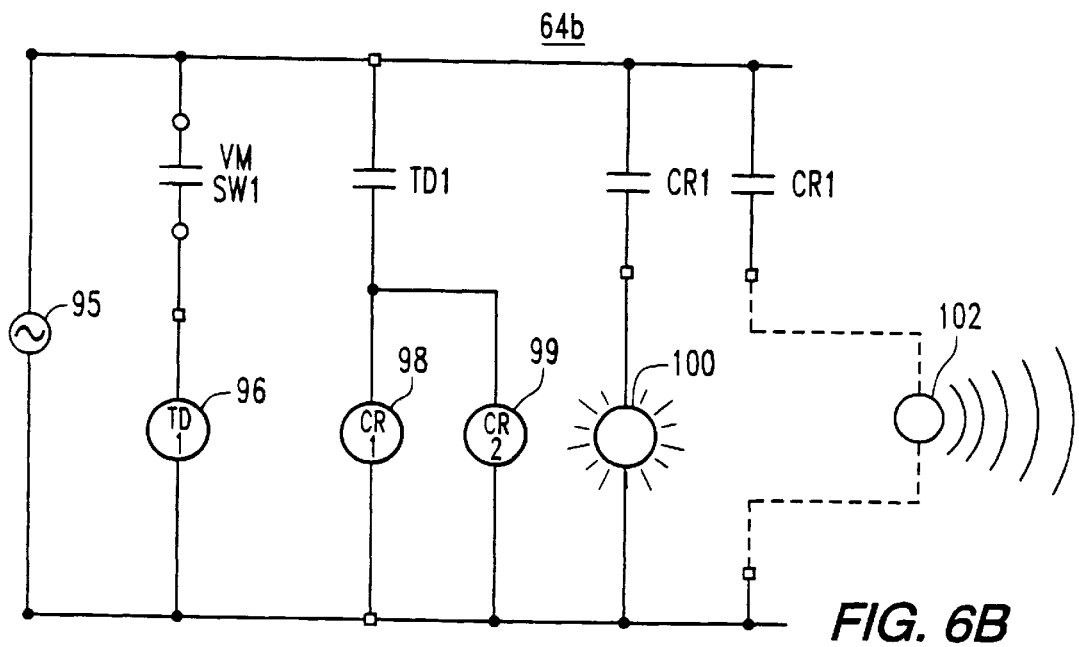

With additional reference to FIG. 6B, showing the control portion 64b of the grounding arrangement, when the voltage measured by voltmeter/relay 90 is equal to that set by voltage setting mechanism 94, contact VMSW1 will close. This voltage may be set to the breakdown voltage of the spark gap device 70, or higher. The closing of contact VMSW1 allows ac source 95 to energize relay 96. In order to eliminate operation of the grounding arrangement during momentary faults, the relay 96 is a time delay relay set for a couple of seconds, for example.

Thus, after this predetermined time delay, relay 96 will cause closure of contact TD1 to simultaneously allow energization of relays 98 and 99. When relay 98 activates, contacts CR1 will close and activate a visual alarm such as alarm light 100, and, if desired, an audible alarm 102.

With this sustained ground fault, activation of relay 99 will close contacts CR2 of normally open contact array 104 (FIG. 6A), to establish a bypass path around spark gap device 70 relieving it from carrying ground current and providing a solid connection to ground from neutral 30. With current flow, a series grounding resistance is established by the transformer 84/resistor 82 arrangement which reflects the value of resistance 82, modified by the transformer turns ratio, back into the primary of transformer 84. The sensor system communication will be terminated, however, the equipment being supplied by the powerline system may still operate.

Although the present invention has been described with a certain degree of particularity, it is to be understood that various substitutions and modifications may be made without departing from the spirit and scope of the invention as defined in the appended claims.

What is claimed is:

1. A grounding arrangement for a powerline system having information signals transmitted thereon, and having a system neutral point, said powerline system being subject to potential ground faults, comprising:
   (A) resistive means connected to said system neutral;
   (B) an overvoltage spark gap device connected between said resistive means and an electrical ground, and having a predetermined threshold voltage which, if exceeded, will cause conduction of said spark gap device;
   (C) circuit means responsive to a predetermined voltage value across said resistive means to establish a current bypass to ground, around said spark gap device.

2. An arrangement according to claim 1 wherein:
   (A) said circuit means is operable to establish said current bypass to ground only after a predetermined time delay after said predetermined voltage value has been attained.

3. An arrangement according to claim 1 which includes:
   (A) means for setting said predetermined voltage value to be equal to or greater than said predetermined threshold voltage which causes conduction of said spark gap device.

4. An arrangement according to claim 1 which includes:
   (A) means for displaying said voltage value across said resistive means.

5. An arrangement according to claim 1 wherein:
   (A) said powerline system is a three phase system having a three phase transformer, with a neutral, at a first location for delivering electrical energy, and an electrical device at a second remote location for utilizing said electrical energy;
   (B) said resistive means being connected to said neutral of said transformer at said first location.

6. An arrangement according to claim 2 which includes:
   (A) means for providing a visual indication of said predetermined voltage value having been attained.

7. An arrangement according to claim 2 which includes:
   (A) means for providing an audible indication of said predetermined voltage value having been attained.

8. An arrangement according to claim 2 wherein said circuit means includes:
   (A) a normally open contact array in parallel, with said spark gap device;
   (B) a time delay relay operable in response to said predetermined voltage value having been attained, to close said normally open to contact array after said predetermined time delay.

9. A grounding arrangement for a multi-phase powerline system having information signals transmitted thereon, and having a system neutral, said powerline system being subject to potential ground faults, comprising:
   (A) a single phase transformer having a primary winding with first and second ends, with said first end being connected to said system neutral;
   (B) an overvoltage spark gap device having first and second electrodes, with said first electrode being connected to said second end of said single phase transformer and said second electrode being connected to an electrical ground, and having a predetermined threshold voltage which, if exceeded, will cause conduction of said spark gap device between said electrodes;
   (C) a normally open current path in parallel with said spark gap device;
   (D) said single phase transformer having a secondary winding;
   (E) a resistance connected across said secondary winding;
   (F) a voltage responsive device connected to said resistance and being operable to provide an output signal upon the occurrence of a predetermined voltage across said resistance; and
   (G) means for closing said normally open current path in response to said output signal.

10. An arrangement according to claim 9 wherein:
    (A) said means for closing is operable only after a predetermined time delay after the occurrence of said output signal.

11. An arrangement according to claim 9 which includes:
    (A) means for displaying and adjusting said predetermined voltage across said resistance.

* * * * *